Aug. 14, 1934.  W. F. KIESEL, JR  1,970,321
STEAM ENGINE VALVE
Filed Aug. 3, 1927   5 Sheets-Sheet 1
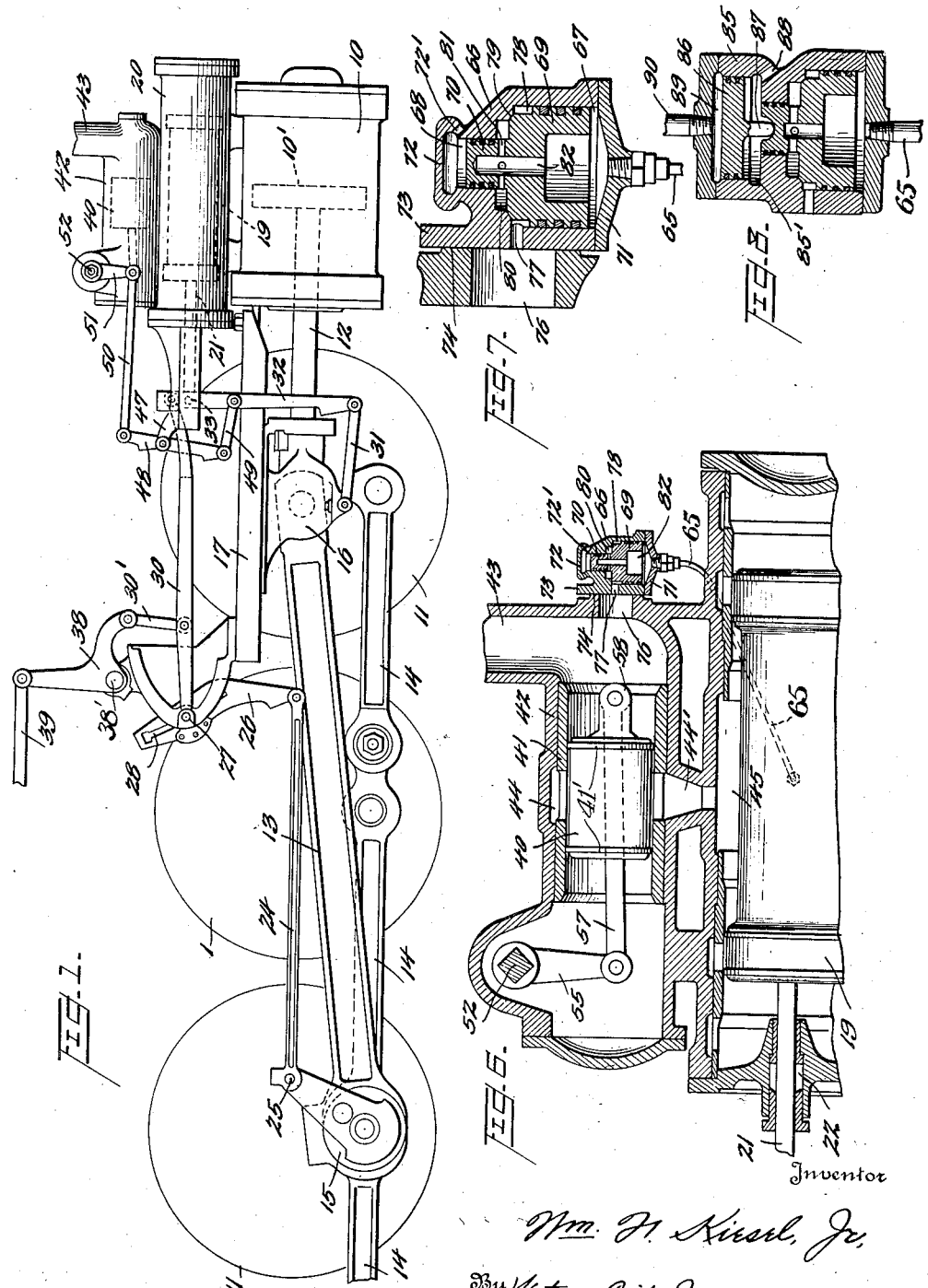

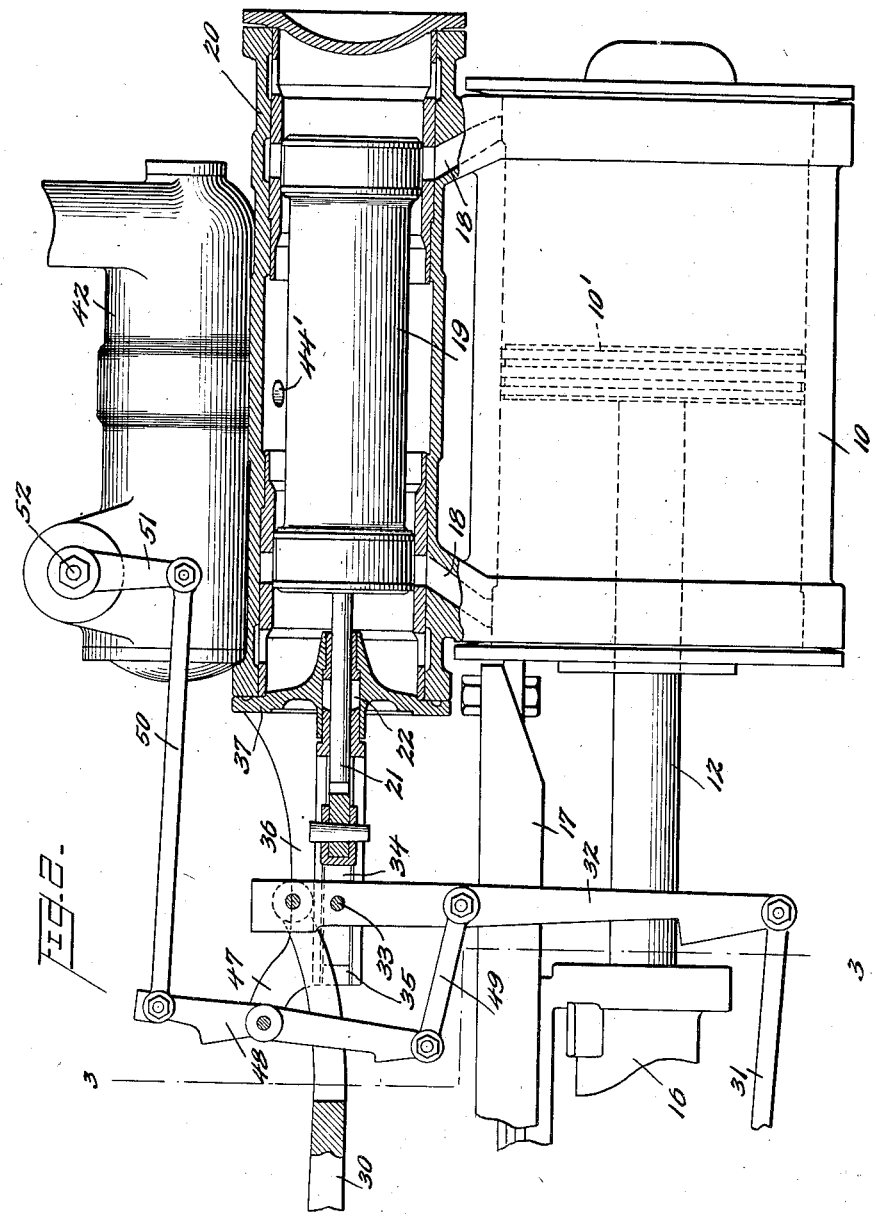

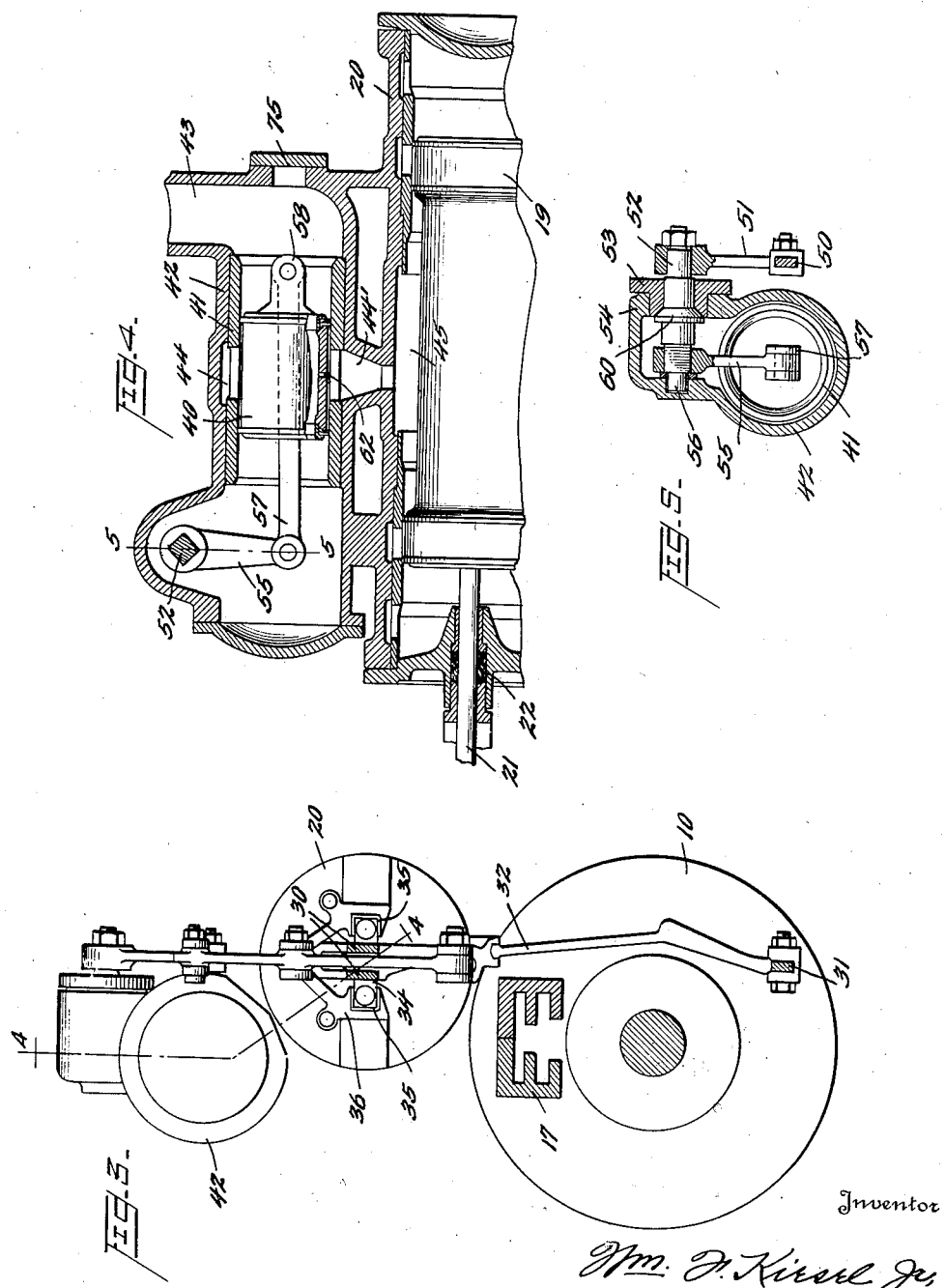

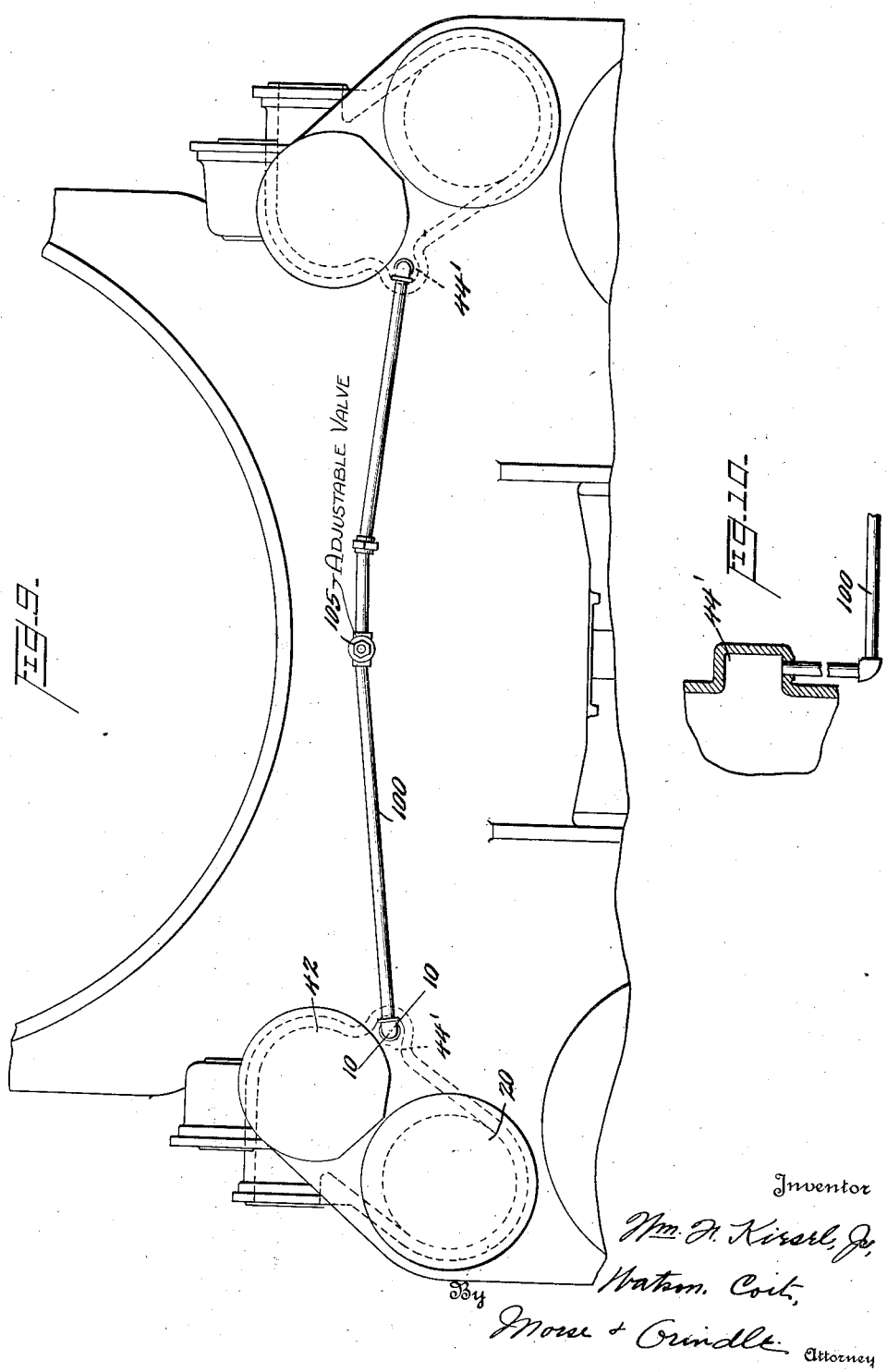

Aug. 14, 1934.   W. F. KIESEL, JR   1,970,321
STEAM ENGINE VALVE
Filed Aug. 3, 1927   5 Sheets-Sheet 5
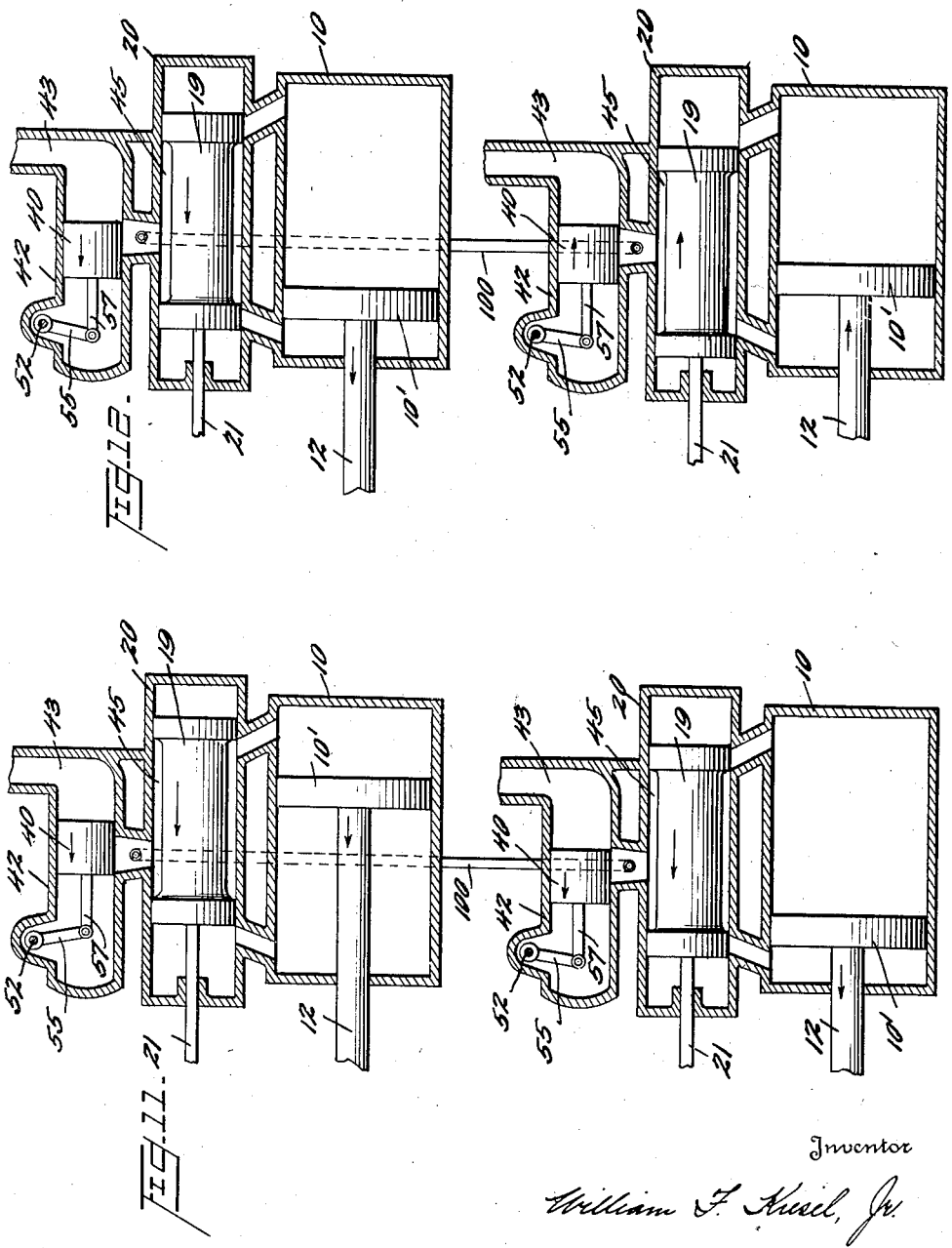

Patented Aug. 14, 1934

1,970,321

UNITED STATES PATENT OFFICE 1,970,321

STEAM ENGINE VALVE

William F. Kiesel, Jr., Altoona, Pa.

Application August 3, 1927, Serial No. 210,412

11 Claims. (Cl. 121—142)

This invention relates to the valves for steam engines and more particularly to valves intended to be used on locomotives operating at very high steam pressures.

It is a general object of the present invention to provide a novel and improved valve for locomotive engines together with operating gear for the same.

More particularly, it is an object of the invention to provide, in a locomotive, a main valve adapted to control the flow of live and exhaust steam to and from a cylinder, together with an auxiliary valve whose sole function is to control the cut-off and to limit the same to a small percentage of the stroke at moderate and high speeds.

A further object of the invention consists in providing means, to be used in connection with auxiliary and limiting cut-off valves, to supply steam throughout substantially the full stroke of the piston for starting purposes.

One feature of the invention comprises a novel arrangement for actuating the auxiliary cut-off valve from the linkage mechanism of the main valve.

A further feature of the invention comprises the arrangement of an auxiliary cut-out valve controlling the admission of live steam into what may be termed the receiver volume of the main valve chamber.

Another and further object of the invention consists in the provision of novel means for by-passing live steam around the cut-off valve to the receiver volume of the main valve chamber on starting, when the auxiliary cut-off valve produces a cut-off too early in the stroke of the piston to provide adequate power.

Other and further features and objects of the invention will be more apparent to those skilled in the art upon consideration of the accompanying drawings and following specification wherein are disclosed several exemplary embodiments of the invention with the understanding that such changes may be made therein as fall within the scope of the appended claims without departing from the spirit of the invention.

In said drawings:

Figure 1 is a side elevation of a portion of a locomotive disclosing a cylinder, the cylinder valves, some of the drivers, the connecting rod and the valve operating mechanism, or gear, which is of the Walschaert type;

Figure 2 is a longitudinal vertical section through the main valve showing in detail the drive mechanism for it and the auxiliary valve;

Figure 3 is a transverse vertical section on broken line 3—3 of Figure 2;

Figure 4 is a longitudinal section through the auxiliary valve and the main valve taken on broken line 4—4 of Figure 3;

Figure 5 is a transverse section through the rock shaft and operating arms of the auxiliary valve taken on line 5—5 of Figure 4;

Figure 6 is a view similar to Figure 4 but showing a modification;

Figure 7 is an enlarged view in vertical section of the automatic by-pass valve shown in Figure 6;

Figure 8 is a view similar to Figure 7, but showing a by-pass valve having pneumatic control;

Figure 9 is a front elevational view of a locomotive showing a further method of supplying steam to the main valves, during starting, by means of a by-pass pipe connecting the receiver volumes of the two main valves;

Figure 10 is a section on line 10—10 of Figure 9.

Figure 11 is a diagrammatic view representing both cylinders of a locomotive and showing the respective positions of pistons and valves at cut-off by the auxiliary valve for the left-hand cylinder; and Figure 12 is a view similar to Fig. 11 but showing the pistons and valves in position for the right-hand cylinder cutoff by the auxiliary valve, this and Fig. 11 illustrating the manner of providing steam between cutoff by the auxiliary and the main valve from the engine on the opposite side.

With the use of very high pressure steam, the conventional form of valve and valve motion, now used on locomotives, is not satisfactory to realize the expansion possibilities of such pressure, and some means must be provided to achieve earlier cut-off than is now possible without excessive throttling of the steam. The conventional slide valve either of the D or piston type, operated by any form of valve gear, such as the Walschaert type, has the various events which it controls so interconnected that a change in the hook-up to change, for instance, the cut-off, causes a change in the various other events, notably release and compression. If, with admission occurring slightly before dead center, an attempt is made to provide cut-off early in the stroke, the angle of advance, determined by these two events, is large and causes either release or compression or both to be early. If one is improved, it must be at the expense of the other. On high speed engines, a rather high compression is desired to absorb the kinetic energy of the reciprocating parts at the end of the strokes, but on lower speed engines such compression is not only unnecessary but undesirable because it reduces the amount of work per stroke. A locomotive is essentially a variable speed machine, and it will be seen that an attempt to obtain an early cut-off at moderate speeds, as required for economy, will increase the compression too greatly and also seriously advance the release. The release should not be advanced materially where using very high pressure steam, for it materially reduces the economy.

The present invention contemplates overcoming the above and other difficulties by the use of an auxiliary or cut-off valve arranged between the main valve, which may be of any desired form, and the steam pipe and actuating this cut-off valve from the same link motion that actuates the main valve. According to this invention the main valve is so arranged as to permit cut-offs varying from small amounts to a predetermined maximum of 80% to 90% as desired, whereas the cut-off valve is so arranged as to admit steam up to about 10% of the piston travel when the link block is in mid-position and up to about 25% when the link block is in either of its extreme positions. This valve controls the admission of steam into a definitely determined space, in the case shown the volume between the main valve and its barrel and the volume between the auxiliary valve and its barrel. The main valve disclosed is of the inside admission type and the space between it and the main barrel thereof and the corresponding space in the cut-off valve, and into which steam is admitted by the cut-off valve will hereinafter be designated the receiver volume. In operation, after closing of the cut-off valve, the receiver volume and the portion of the cylinder up to the piston will be filled with live steam which then expands and moves the piston until the main valve closes and causes cut-off. Further expansion will then occur in the cylinder volume alone, and will continue until the main valve opens for release.

However, when starting and travelling slowly under a heavy load, it is desirable to permit a maximum cut-off of at least 80% which the main valve will allow, but which the cut-off valve will not allow. Hence some means is provided to allow by-passing or leakage of steam from the source of steam supply into the receiver volume for starting purposes, but this means is provided with a constriction so that the amount of steam flow therethrough will produce but little effect when running at high speeds and, therefore, the cut-off as determined by the auxiliary cut-off valve will be effective.

Referring to the drawings, there will be seen at 10 the conventional cylinder of a locomotive within which is located the piston 10' driving the drivers 11 through the piston rod 12, the connecting rod 13 and the pitman rods 14. The rod 13 is journaled on crank pin 15 secured to the face of one of the drivers. The connection between the connecting rod 13 and the piston rod 12 is effected at the cross head 16 which slides in the guides 17.

Steam is admitted to either end of the cylinder as required and exhausted therefrom through the ports 18 controlled by the slide valve 19, reciprocable in a valve chamber 20, and adapted to be moved in timed relation to the piston by a valve rod 21 passing through a stuffing box 22 in one head of the chamber. The valve 19 may be of any of the well known and conventional types, the one shown being a piston valve to provide inside admission and outside exhaust. It is not believed to be necessary to here describe the operation of the valve 19 other than to say that it is so designed as to allow cut-off up to substantially 80% to 90% of the piston stroke, and can be, by its linkage, adjusted to produce cut-offs at fairly small percentages of the piston stroke, say about 20% to 25%. Adjustments of the linkage to thus vary the cut-off through this range has but little effect on admission, release and compression.

Motion is imparted to the valve in timed relation to the motion of the piston by means of the well known Walschaert valve gear, comprising the eccentric rod 24 driven from the eccentric pin 25 and serving to rock the link 26 trunnioned at 27 and provided with an arcuate slot 28 in which a link block secured to one end of the radius 30 is adjustably positioned. A link 31 is attached to the cross head and enables the motion of this cross head to be combined with the motion of the radius rod obtained from the eccentric pin by means of the "lap and lead" lever 32 having its ends pivoted respectively to one end of each radius rod 30 and the link 31. At 33, the lap and lead lever 32 is pivotally connected to a slider 34 operating in ways 35 in the brackets 36 extending from the stuffing-box-end head 37 of the valve chamber 20. It will be seen that the lap and lead lever floats between the link 31 and the radius rod 30 and is supported by means of the slider 34 to which it imparts the combination of the motions of the cross head and the eccentric pin. The amount and direction of movement of the radius rod 30 may be changed by varying the position of the link block in the slot 28 in the link by means of the lifting link 30' attached to the bell crank lever 38, mounted on lift shaft 38' and operated by the reach rod 39 leading to the cab.

In Fig. 4 is shown the auxiliary, or cut off valve comprising a hollow cylinder 40 adapted to be reciprocated within the sleeve 41 in the auxiliary valve housing 42. The valve is open at both ends in order that steam may flow through the same from the main steam inlet 43. It is provided with the packing rings 41' to maintain a steam tight fit with the sleeve. When the valve is moved a sufficient distance from its center position, in either direction, steam may flow by the end of the valve and through openings in the sleeve into the annular passage 44 which communicates by way of the port 44' with the central space 45 surrounding the main piston valve 19 which distributes the same to either end of the cylinder in a well known manner.

Motion is imparted to the cut-off valve in the desired relation to the motion of the main valve by means of the linkage best shown in Fig. 2. The arms 36 extending from the head of the main valve chamber to form guides for the slider are bent upwardly to form the trunnions 47 between which is pivoted the lever 48 whose lower end is connected by a link 49 to an intermediate point on the lap and lead lever 32. The upper end of the lever 48 is connected, by a link 50, to the lower end of the arm 51, secured to the rock shaft 52, best shown in Fig. 5. This shaft passes through a gland 53 in the wall of the extension 54, near the top, and at one end, of the auxiliary valve housing. The arm 55 is secured to the inner end of the rock shaft 52 adjacent its bearing 56 in the wall of the extension 54 opposite the gland 53. The lower end of this arm 55 is connected, by a link 57 which passes through the hollow valve member 40, to the trunnions 58 on the far end of that valve member. It will thus be seen that the auxiliary valve will move in unison with the main valve, but not necessarily in exact synchronism therewith. The rock shaft 52 together with its two arms 51 and 55 is used in order to eliminate a stuffing box and its chances for leakage when subjected to the extremely high pressure steam in the auxiliary valve chamber. A tight fit where the rock shaft passes through the gland 53 is obtained by means of the collar 60 secured to the rock shaft and having a ground fit with the inner surface of the gland against which it is maintained by steam pressure.

The operation of the parts of the structure so far described, will be readily understood. It will be seen that the cut-off valve controls absolutely the flow of steam into the space 45 surrounding the main valve, which space has been termed the "receiver volume", and which has less than one third of the cylinder volume. The cut-off valve is timed to open considerably before "admission", as determined by the main valve, so as to fill the receiver volume and to insure that the cut-off valve will govern only the cut-off. In accordance with the showing in this case the setting of the valves is such that in full gear the cutoff valve opens at approximately 9% minus piston stroke and closes at approximately 25% plus, which gives a lead of 9%. Upon "admission" by the main valve, steam expands from the receiver volume and flows into the cylinder followed immediately by a flow of steam directly from the steam pipe through the cut-off valve and the passage 44 into the space 45, and thence into the cylinder until cut-off is effected by the auxiliary valve, after which steam, both in the cylinder and in the receiver volume, will expand until cut-off is effected by the main valve 19, after which further expansion will take place in the cylinder only, until release is effected by the main valve.

The so called "receiver volume" may be of any shape and as previously mentioned has about one-third of the volume of the cylinder. Its function is to provide a relatively larger mean effective pressure, when the main valve cuts off at more than about 67% of stroke, due to the expansion of the larger volume of steam, consisting of, say, one-fourth or one-third of the cylinder, plus an equal amount of receiver volume, plus the cylinder clearance. When, by means of the valve gear, the cut-off of the main valve is changed to the same as that of the cut-off valve, or less, the steam that expands in or into the cylinder, then consists only of the cylinder volume up to cut-off plus the cylinder clearance volume. The steam pressure in the receiver then remains practically constant and it no longer functions in effect on the steam expansion in or into the cylinder, but acts merely as a conduit of steam to the main valve, as if it were merely a part of the steam pipe from the boiler. The object of this is to permit the use of a larger cylinder than used ordinarily or even with various limited cut-off schemes, realizing greater benefit from the expansive force of steam at high pressure without producing starting power in excess of the adhesion between drivers and rail.

The main valve, as before stated, may have a maximum cut-off of from 80% to 90% when the link block is at a maximum distance from the trunnions in either direction, and will preferably have a minimum cut-off, when fully hooked up, substantially equal to the maximum cut-off of the auxiliary valve, i. e., about 25%. The main valve thus has a variation between these limits rather than between the wider limits ordinarily necessary for economical operation. The co-related events controlled by the main valve can thus be better adjusted and proportioned, and furthermore less throttling of the steam takes place during admission.

The auxiliary valve is designed to provide cut-offs varying from substantially 10% to 25% of the piston stroke in accordance with the position of the link block. The percentage of cut-off varies with movement of the link block in the link in the same manner as does that of the main valve. With this arrangement, it will be seen that while the port opening afforded by the cut-off valve is large and provides a satisfactory flow of steam at the smaller cut-offs without undue throttling, this valve, nevertheless, limits the cut-off to a maximum of about 25% when the linkage is in extreme position and can reduce the same to a minimum of substantially 10% when the linkage is fully hooked up, but maximum cut-off of around 80% cannot be obtained for starting purposes. It is essential that a cut-off of such proportions be available for starting under heavy loads and on steep grades.

Steam for cut-offs up to substantially 80%, or the maximum allowed by the main valve design and setting may be provided in various ways such as by a bleeder, or port 62, in the wall of the auxiliary valve 40, as shown in Fig. 4. This port is positioned in such a manner, in relation to the passage 44, that it is always in communication with this passage when the passage is covered by the valve.

This bleeder is of such size as to provide sufficient steam to the receiver after closure of the cut-off valve, for cut-offs up to the maximum allowed by the main valve when starting and when the locomotive is moving at very slow speeds. However, the port is so restricted that at speeds of above 10 miles an hour the amount of steam flowing through the bleeder is inconsequential, due to the short time occupied by each stroke, and has almost no effect on the steam distribution which is then wholly determined by the auxiliary valve, whereas at starting and at very low speeds, the cut-off is wholly determined by the main valve.

Various ways for obtaining by-pass steam in order to permit late cut-off for starting, suggest themselves. For instance, instead of the bleeder port 62 as shown in Fig. 4, a restricted pipe 65 may connect the steam pipe 43 with the "receiver volume" 45 and function substantially the same as does the bleeder port.

As shown in the modification of Figs. 6 and 7 a pipe 65 extends from the steam pipe 43 to the receiver volume 45, and has sufficient area to permit the required amount of steam to flow therethrough for starting purposes after cut-off. An automatic valve 66 is provided between this pipe 65 and the steam pipe 43 and is best shown in Fig. 7. It includes within the casing two communicating, concentric, cylindrical bores 67 and 68 in which fit, respectively, the pistons 69 and 70, either integral, or suitably secured together and each provided with packing rings. The bottom of the bore 67 is closed by the head 71 through which passes the pipe 65. The head 72, preferably formed integral with the casing, closes the opposite end of the bore 68 which, however, is vented to the atmosphere at 72'. The flange 73 on the side of the casing is adapted to be secured against the flat end 74 of the auxiliary valve housing 42, after the closure plug 75, shown in Fig. 4, has been removed so that steam may pass through the opening 76 in the steam pipe and through the port 77 into the ring-like chamber 78 around the piston 69 near its junction with the smaller piston.

A beveled seat 79 between the two cylindrical bores in the housing is engaged by a suitable bevel on the upper end of the larger piston to prevent steam flowing through the port 77 from passing beyond the space 78, under running conditions, and into the space 80, at the junction of the two pistons, and thence through the bores 81 and 82 into the space below the larger piston and thus into the pipe 65. When there is no pressure or a low pressure in the receiver 45 the high pressure steam entering through the port 77 and acting on the annular area of the larger piston below the space 78 will push the composite piston down and unseat the upper edge of the larger piston from the seat 79 and allow steam to pass into the space 80 and thence through the bores in the pistons and into the pipe 65 for starting purposes. When the valve is unseated the high pressure steam can act on a projected area equal to the total area of the larger piston minus the area of the smaller piston and can thus maintain the valve unseated until the pressure in the receiver is great enough so that its effect on the total area (the underside) of the larger piston overbalances the effect of the high pressure steam on the upper side. When once closed a greater difference in pressure is required to open the valve because of the smaller area exposed to high pressure steam when closed. The valve 66 is thus an automatic valve, allowing steam to flow into the receiver volume when the pressure in the receiver is below a predetermined maximum and preventing flow when the pressure is above that predetermined maximum.

It may sometimes be advisable to provide for manual control of the flow of by-pass steam into the receiver volume, in which case a valve similar to 66 may be provided for pneumatic control from the cab such as disclosed in Fig. 8. Here the valve parts are the same as those described in connection with Fig. 7 except that instead of the head 72 on the end of the smaller cylinder there is arranged on the upper end of the valve casing a pneumatic cylinder 85 in which the piston 86 is adapted to move. This piston has a stud 87 bearing on the top of the smaller piston. Between the smaller piston and the piston 86 the space 85' is vented to the atmosphere as at 88. Above the piston 86 the space 89 is in communication with the source of compressed air supply of the locomotive, controlled by an engineer's valve (not shown), through the pipe 90 so that the by-pass valve can be held open, if desired, by the engineer irrespective of the receiver pressure, but will close automatically when the air pressure is removed from the auxiliary piston, if the pressure in the receiver is sufficiently high.

In Fig. 9 is disclosed a further modification including means for providing steam to the main valve chambers to permit late cut-off in starting wherein the receiver volumes of the two separate engines, one on either side of the locomotive are connected together by a by-pass pipe either with or without a valve or restricting orifice. This pipe 100 passes behind the cylinder saddle castings beneath the boiler and has one end in communication with the receiver volume of one engine, and the other with the corresponding receiver volume on the other engine. One end of the pipe is thus in communication with live steam during the time that the cut-off valve on that side of the locomotive is open. This valve opens, as previously explained, considerably before admission. This same end of the pipe is in communication with expanding steam after cut-off by the auxiliary valve and until cut-off by the main valve. The same condition exists at the other end of the pipe in respect to its valves. The pipe 100 is of restricted area as shown in Figures 9 and 10 so that only a small quantity of steam will pass through the same.

In order to better visualize the operation of the modification shown in Figure 9, reference should be had to Figures 11 and 12. These figures have been drawn with the following assumptions; that the valve gear is set for maximum cutoff and that the main valve cuts off at approximately 90% of the stroke and opens on dead center positions (no lead) and that the cutoff valve cuts off at 25% of the stroke and opens from 9% to 10% before the main valve opens (10% lead). Figure 11 shows the upper or left-hand cylinder with the piston moving to the rear and steam entering the head end since the main valve, which is of the inside admission type, is open. The cutoff valve is just closed for the piston is at 25% stroke. The right-hand or lower cylinder which leads the left-hand cylinder by 90° has its piston positioned at substantially 90% stroke, which corresponds to the 25% position of the left-hand cylinder. Under these conditions the main valve of the right-hand cylinder has just closed and since there is a 10% lead, the cutoff valve is commencing to open for the return stroke, as shown. The opening, therefore, of this cutoff valve corresponds with the closing of the cutoff valve in the left-hand cylinder so that as soon as live steam is no longer delivered to the main valve of the left-hand cylinder from its own cutoff valve, it is delivered through the pipe 100 by virtue of the opening of the cutoff valve in the right-hand cylinder.

In Figure 12 is shown a condition at the point of cutoff by the main valve of the left-hand cylinder, at which time the piston has moved 90% of its stroke from the head end. Under these conditions the cutoff valve of the left-hand cylinder, which has 10% lead, is commencing to open for the return stroke, as shown. The right-hand cylinder leading by 90° has its piston now 25% toward the head end on the return stroke, at which time its auxiliary valve has just commenced to cut off. It will be seen that steam for the remainder of the stroke of the right-hand piston up until cutoff by its main valve, which is shown as open, will now be received through the pipe 100 by virtue of the opening of the cutoff valve of the left-hand cylinder.

From the above example it is clearly evident that each piston has steam available to it for the first 25% of its stroke directly through its own cutoff valve and for the remainder of its stroke, up until cutoff by its main valve, through the cross pipe 100 by virtue of the opening of the cutoff valve in the opposite cylinder.

If it is desired, the pipe 100 may be made of larger diameter than required and may be provided with a choke valve 105 as a means for reducing the opening in the pipe to the desired size. Such a valve may be of any conventional form as plug, globe or the like, which will permit throttling of the flow through the pipe 100 by restricting it.

Having thus described the invention what is claimed as new and desired to be secured by Letters Patent is:—

1. In a steam locomotive, in combination, a cylinder, a piston reciprocable therein, a main valve adapted to control admission and to provide the maximum cut-off ever required, a cut-off valve between the source of steam and the main valve arranged to provide as its maximum cut-off that required at normal operating speeds, and means of constant admission area to deliver steam to said main valve for starting purposes during the period from cut-off by the cut-off valve to cut-off by the main valve.

2. In a steam locomotive, in combination, a cylinder, a piston reciprocable therein, a main valve having a continuous component of movement from said piston and adapted to control admission and to provide the maximum cut-off ever required, a cut-off valve between the source of steam and the main valve arranged to provide as its maximum cut-off that required at normal operating speeds, and means effective at low speeds only to deliver sufficient steam to operate the locomotive to said main valve during the period from cut-off by the cut-off valve to cut-off by the main valve.

3. In a steam locomotive, in combination, a cylinder, a piston reciprocable therein, a main valve having a continuous component of movement from said piston and adapted to control admission and to provide the maximum cut-off ever required, a cut-off valve between the source of steam and the main valve arranged to provide as its maximum cut-off that required at normal operating speeds, and a restricted passage from said source of steam to said main valve adapted to pass only sufficient steam to be effective at low speeds between cut-off by the cut-off valve and cut-off by the main valve.

4. In a locomotive having two main cylinders provided with pistons coupled to operate with a 90° phase displacement and each cylinder having a main valve which in full gear cuts off steam from its cylinder after the piston has completed at least two thirds of its stroke, the combination of a cut-off valve for each cylinder arranged to cut off steam to said main valve before the piston has completed one third of its stroke, a steam space between each cut-off valve and its main valve, and a steam passage connecting the spaces.

5. In a locomotive having two main cylinders provided with pistons coupled to operate with a 90° phase displacement and each cylinder having a main valve which in full gear cuts off steam from its cylinder after the piston has completed at least two thirds of its stroke, the combination of a cut-off valve for each cylinder arranged to cut off steam to said main valve before the piston has completed one third of its stroke, a steam space between each cut-off valve and its main valve, a steam passage connecting the spaces and means to adjustably restrict said passage.

6. In a locomotive having two main cylinders provided with pistons coupled to operate with a 90° phase displacement and each cylinder having a main valve which in full gear cuts off steam from its cylinder after the piston has completed at least two thirds of its stroke, the combination of a cut-off valve for each cylinder arranged to cut off steam to said main valve before the piston has completed one third of its stroke, a steam space between each cut-off valve and its main valve, a steam passage connecting the spaces, said passage having such a capacity as to materially reduce the flow of steam therethrough at engine speeds corresponding to a locomotive speed of approximately ten miles per hour.

7. In a locomotive having two engines with their cranks set 90° apart, in combination, a main valve and a cut-off valve for each engine, a steam space between said valves, means to deliver steam to the steam space of each engine after cut-off by the cut-off valve thereof, said means comprising a restricted steam passage connecting the said steam spaces of the two engines.

8. In a locomotive, in combination, a cylinder, a piston, piston rod, connecting rod and crank, a main valve for said cylinder, a linkage adapted to drive said valve including a link operated from said crank, a radius rod driven by said link and a "lap and lead" lever to combine the motions of said radius rod and piston, said lever being connected to the main valve stem near the connection of said lever and radius rod, a cut-off valve adjacent said main valve and means to drive said cut-off valve indirectly from said "lap and lead" lever only.

9. In a locomotive, in combination, a cylinder, a piston, piston rod, connecting rod and crank, a main valve for said cylinder, a linkage adapted to drive said valve including a link operated from said crank, a radius rod driven by said link and a "lap and lead" lever to combine the motions of said radius rod and piston, said lever being connected to the main valve stem near the connection of said lever and radius rod, a cut-off valve adjacent said main valve and means to drive said cut-off valve from said "lap and lead" lever, said means comprising a pivoted lever, a link connecting one end of said lever to said "lap and lead" lever and a link connecting said lever to said cut-off valve.

10. In a locomotive, in combination, a cylinder, a piston, piston rod, connecting rod, cross head and crank, a main valve for said cylinder, a linkage adapted to drive said valve including a link operated from said crank, a radius rod driven by said link and a "lap and lead" lever to combine the motions of said radius rod and cross head, said lever being connected to the main valve stem near the connection of said lever and radius rod, a cut-off valve adjacent said main valve and means to drive said cut-off valve from said "lap and lead" lever, said means including a pivoted lever and a link connecting said lever to the "lap and lead lever".

11. In a locomotive, in combination, a pair of cylinders, pistons therein adapted to operate with cranks at 90° displacement, a main valve chamber for each cylinder, a valve therein to control admission, cut-off, release and compression, a steam supply pipe, a cut-off valve and chamber between the supply pipe and each main valve chamber, a receiver volume intermediate each main and cut-off valve chamber and in communication with each chamber, and means connecting said receiver volumes and arranged to provide steam from one to the other between cut-off of the valves for each cylinder, said means automatically reducing the flow between receiver volumes at increasing speeds of rotation of the engine.

WILLIAM F. KIESEL, Jr.